US012528289B2

(12) United States Patent
Mizuno

(10) Patent No.: US 12,528,289 B2
(45) Date of Patent: Jan. 20, 2026

(54) LIQUID DROPLET DISCHARGING APPARATUS

(71) Applicant: BROTHER KOGYO KABUSHIKI KAISHA, Nagoya (JP)

(72) Inventor: Taisuke Mizuno, Yokkaichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 149 days.

(21) Appl. No.: 18/502,164

(22) Filed: Nov. 6, 2023

(65) Prior Publication Data

US 2024/0217231 A1 Jul. 4, 2024

(30) Foreign Application Priority Data

Dec. 28, 2022 (JP) ................................ 2022-211071

(51) Int. Cl.
*B41J 2/045* (2006.01)
*B41J 2/14* (2006.01)

(52) U.S. Cl.
CPC ........ *B41J 2/04581* (2013.01); *B41J 2/14233* (2013.01)

(58) Field of Classification Search
CPC .......................... B41J 2/04581; B41J 2/14233
See application file for complete search history.

(56) References Cited

U.S. PATENT DOCUMENTS

2017/0246893 A1 8/2017 Muto et al.
2021/0155000 A1* 5/2021 Kakiuchi ............ B41J 2/14201

FOREIGN PATENT DOCUMENTS

JP 2017149120 A 8/2017

* cited by examiner

*Primary Examiner* — Lisa Solomon
(74) *Attorney, Agent, or Firm* — Element IP, PLC

(57) ABSTRACT

A liquid droplet discharging apparatus includes: a channel member which has a channel including a nozzle and a pressure chamber communicating with the nozzle; and a piezoelectric element fixed to the channel member and configured to apply pressure to liquid inside the pressure chamber to discharge liquid droplets of the liquid from the nozzle. A natural frequency Fr of the channel is not less than 140 kHz, a recording resolution which is a resolution of an image to be recorded by the liquid droplet is not more than 600 dpi, and a diameter D [μm] of the nozzle and the natural frequency Fr [kHz] satisfy: D≥0.0412×Fr+16.38.

10 Claims, 7 Drawing Sheets

LIQUID DROPLET DISCHARGING APPARATUS

REFERENCE TO RELATED APPLICATIONS

This application claims priority from Japanese Patent Application No. 2022-211071 filed on Dec. 28, 2022. The entire content of the priority application is incorporated herein by reference.

BACKGROUND ART

There is a known liquid discharging apparatus in which a driving frequency of a driving pulse for driving a piezoelectric element is made to be less than 50 kHz. By making the driving frequency of the driving pulse to be less than 50 kHz, a time from a preceding discharge up to a next discharge becomes long, which in turn makes the next discharge to be performed in a state that a meniscus in a nozzle is located at a position nearer to an initial position. As a result, generation of any deposit or sediment inside the nozzle is suppressed, thereby lowering any bending in a flying direction of a liquid droplet.

SUMMARY

In order to perform a high-speed recording, it is considered to increase the driving frequency to be high, namely, to be not less than 50 kHz. One of the means for increasing the driving frequency is to increase a natural frequency Fr of a channel.

Generally, however, as the natural frequency Fr becomes higher, an amount of a liquid droplet discharged from the nozzle is reduced. Accordingly, in a case that the natural frequency Fr is increased, it is not possible to discharge the liquid droplet in an amount sufficient for the recording, depending on a recording resolution and/or the diameter of the nozzle.

An object of the present disclosure is to provide a liquid droplet discharging apparatus capable of discharging liquid droplets in an amount sufficient for the recording, with a high driving frequency.

According to an aspect of the present disclosure, there is provided a liquid droplet discharging apparatus including: a channel member having a channel including a nozzle and a pressure chamber communicating with the nozzle; and a piezoelectric element fixed to the channel member and configured to apply pressure to liquid inside the pressure chamber to discharge liquid droplets of the liquid from the nozzle, wherein a natural frequency Fr of the channel is not less than 140 kHz, a recording resolution which is a resolution of an image to be recorded by the liquid droplet is not more than 600 dpi, and a diameter D [μm] of the nozzle and the natural frequency Fr [kHz] satisfy: $D \geq 0.0412 \times Fr + 16.38$.

According to the aspect of the present disclosure, the natural frequency Fr is not less than 140 kHz, thereby making it possible to increase the driving frequency. Further, the recording resolution is not more than 600 dpi and the diameter D [μm] of the nozzle and the natural frequency Fr [kHz] satisfy: $D \geq 0.0412 > Fr + 16.38$, thereby making it possible to discharge the liquid droplets in an amount sufficient for the recording, as indicated by a result of analysis to be described later on.

DESCRIPTION

<Overall Configuration of Printer 100>

Figure 1:
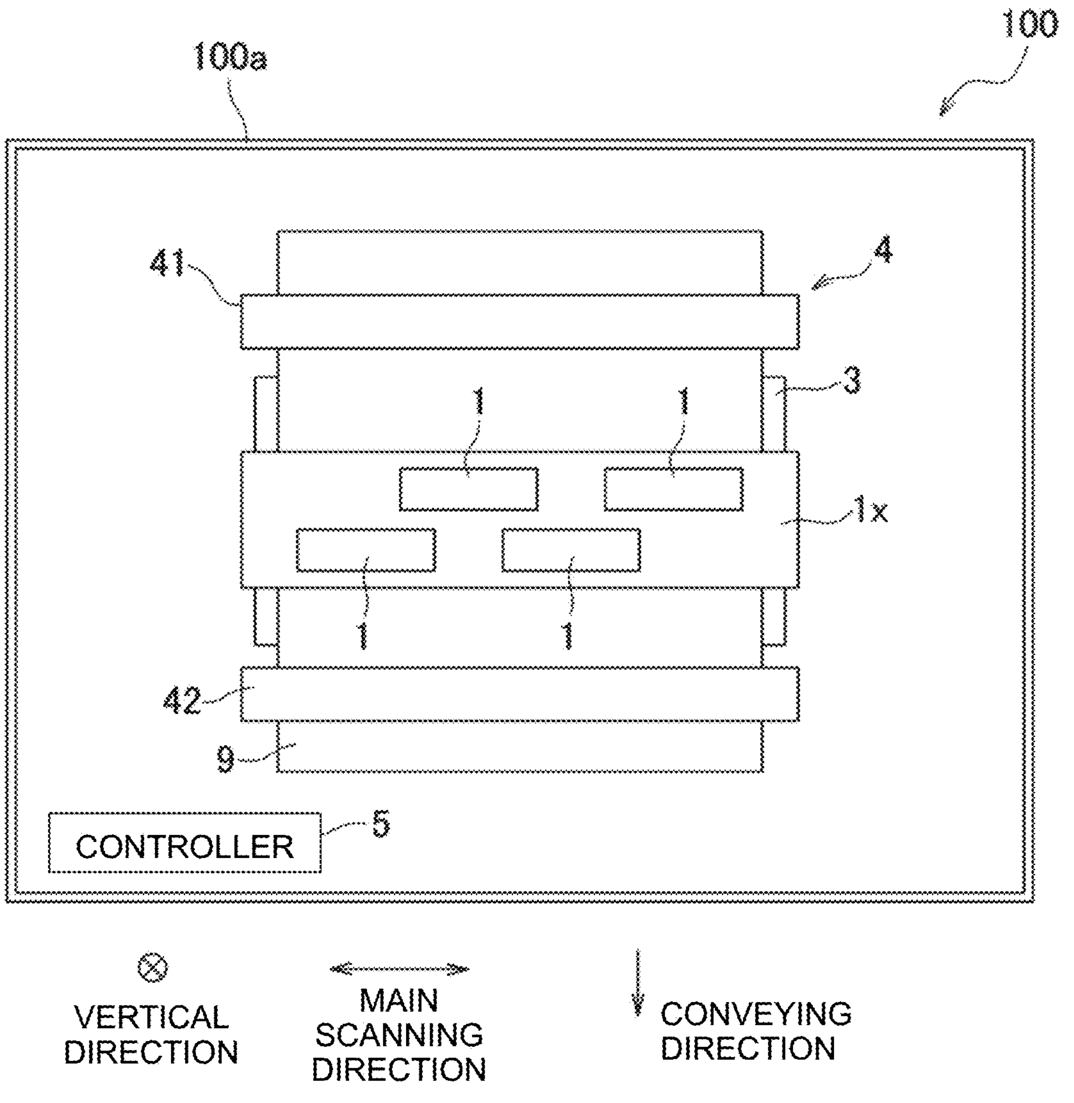
FIG. 1 is a plan view of a printer according to an embodiment of the present disclosure.

A printer 100 according to an embodiment of the present disclosure is provided with a casing 100*a*, a head unit 1*x*, a platen 3, a conveying mechanism 4 and a controller 5, as depicted in FIG. 1. The head unit 1*x*, the platen 3, the conveying mechanism 4 and the controller 5 are arranged inside of the casing 100*a*. The printer 100 is further provided with an input part constructed of a button arranged on an outer surface of the casing 100*a*.

The head unit 1*x* is long in a main scanning direction. The main scanning direction is a direction along a width of a paper sheet 9 and is orthogonal to a vertical direction. The head unit 1*x* is of a line system in which ink is discharged with respect to the paper sheet 9 in a state that a position of the head unit 1*x* is fixed. The head unit 1*x* includes four heads 1. Each of the four heads 1 is long in the main scanning direction, the four heads 1 are arranged in a staggered manner in the main scanning direction.

The platen 3 is a plate along a plane orthogonal to the vertical direction, and is arranged below the head unit 1*x*. The paper sheet 9 is supported on the upper surface of the platen 3.

Figure 2:
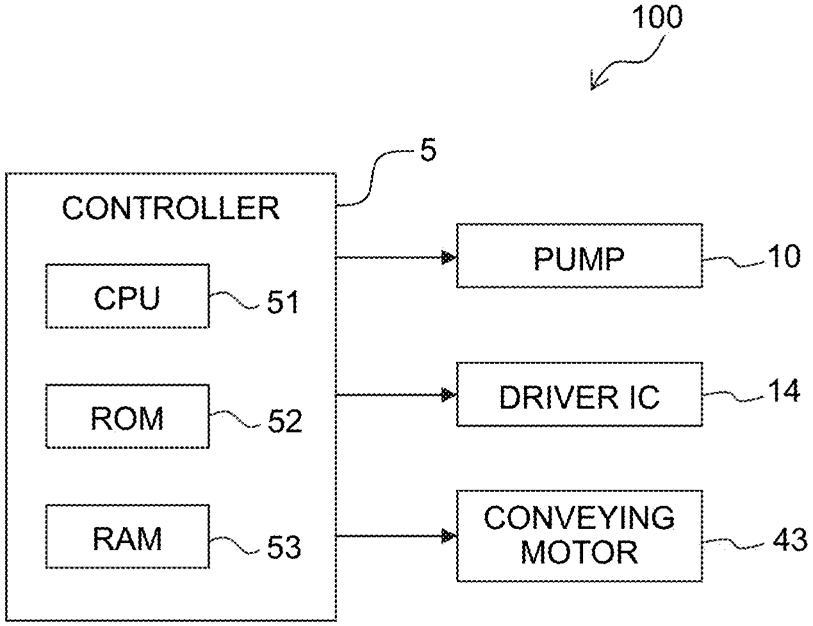
FIG. 2 is a block diagram depicting an electric configuration of the printer.

The conveying mechanism 4 includes two roller pairs 41 and 42 and a conveying motor 43 as depicted in FIG. 2. In a conveying direction, the head unit 1*x* and the platen 3 are arranged between the two roller pairs 41 and 42. The conveying direction is orthogonal to the vertical direction and the main scanning direction. In a case that the conveying motor 43 is driven by a control of the controller 5, the two roller pairs 41 and 42 are rotated. By the rotations of the two roller pairs 41 and 42, the paper sheet 9 pinched by the two roller pairs 41 and 42 is conveyed in the conveying direction.

As depicted in FIG. 2, the controller 5 includes a CPU 51, a ROM 52 and a RAM 53.

The CPU 51 executes a variety of kinds of control based on data inputted from an external apparatus or device and/or the input part, and in accordance with a program and data stored in the ROM 52 and/or the RAM 53. The external apparatus is, for example, a PC.

The ROM 52 stores the program and the data with which the CPU 51 performs the variety of kind of control. The RAM 53 temporarily stores data used by the CPU 51 in a case that the CPU 51 executes a program.

<Configuration of Head 1>

Figure 4:
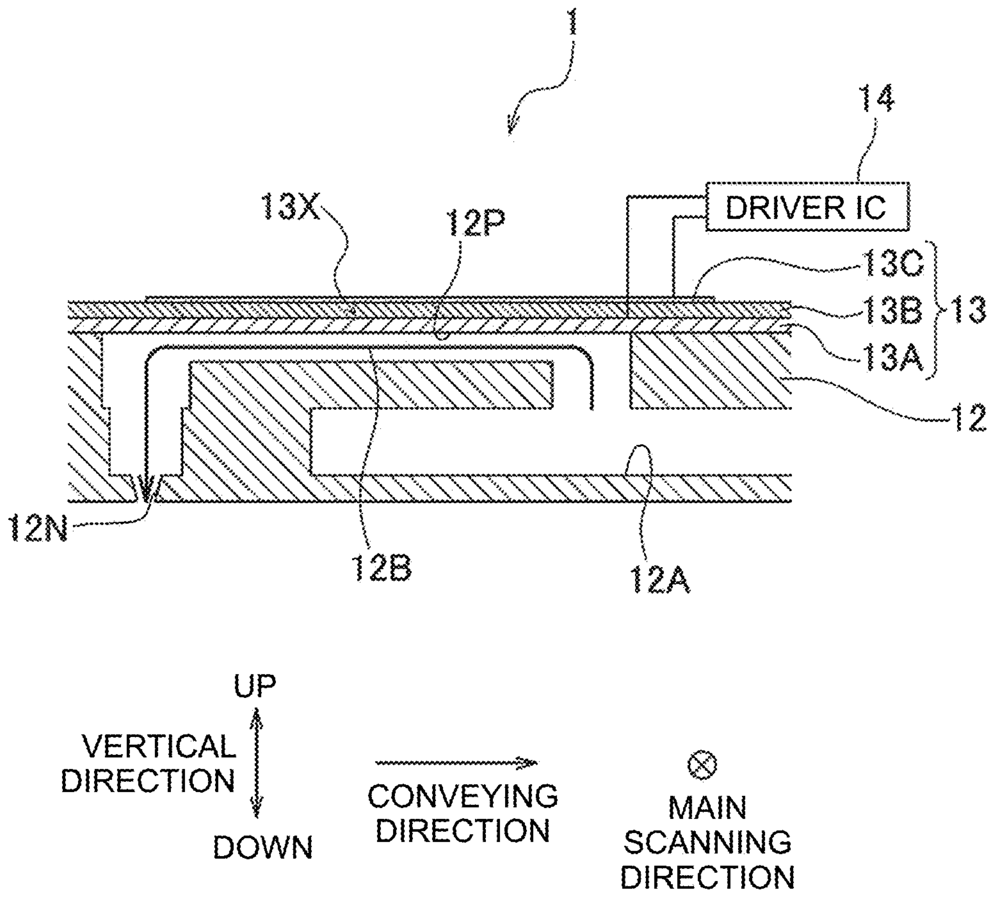
FIG. 4 is a cross-sectional view of one of the four heads taken along a IV-IV line of FIG. 3.

As depicted in FIG. 4, the head 1 includes a channel member 12 and an actuator member 13.

Figure 3:
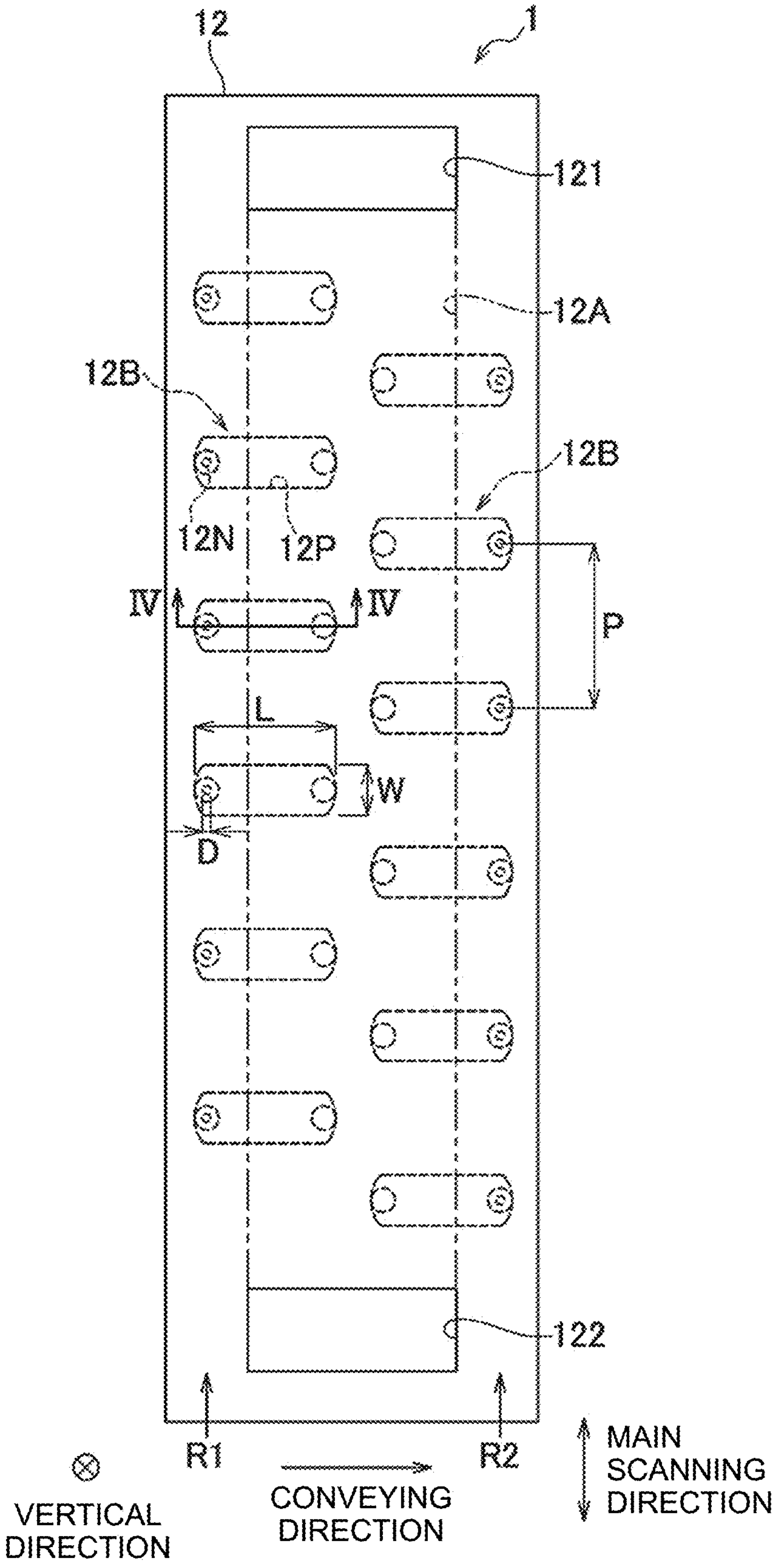
FIG. 3 is a plan view depicting one of four heads constructing a head unit of the printer.

A supply port 121 and a return port 122 are opened in the upper surface of the channel member 12, as depicted in FIG. 3. Each of the supply port 121 and the return port 122 communicates with an ink tank via a tube.

The channel member 12 has a common channel 12A and a plurality of individual channels 12B.

The common channel 12A extends in the main scanning direction. The supply port 121 is connected to one end in the main scanning direction in the common channel 12A, and the return port 122 is connected to the other end in the main scanning direction in the common channel 12A. The common channel 12A communicates with the ink tank via the supply port 121 and the return port 122 and communicates with the plurality of individual channels 12B.

Each of the plurality of individual channels 12B includes a nozzle 12N and a pressure chamber 12P communicating with the nozzle 12N. The individual channel 12B corresponds to a "channel" of the present disclosure.

A plurality of pieces of the nozzle 12N is opened in the lower surface of the channel member 12, and a plurality of pieces of the pressure chamber 12P is opened in the upper surface of the channel member 12. In a plane orthogonal to the vertical direction, the opening of the nozzle 12N is substantially circular, and the opening of the pressure chamber 12P is substantially rectangular.

A diameter D of the nozzle 12N is not more than 25 μm. A width W of the pressure chamber 12P is not more than 70 μm. A length L of the pressure chamber 12P is not more than 550 μm. The width W is a length in the main scanning direction, and the length L is a length in the conveying direction.

As depicted in FIG. 3, the nozzles 12N are arranged in a staggered manner in the main scanning direction and construct two nozzle rows R1 and R2. Each of the nozzle rows R1 and R2 is constructed of nozzles 12N which are aligned in the main scanning direction.

In each of the nozzle rows R1 and R2, the nozzles 12N are arranged in the main scanning direction at a pitch P which is not less than 300 dpi. For example, in a case that a recording resolution in each of the nozzle rows R1 and R2 is 300 dpi, the pitch P is approximately 84 μm. The term "recording resolution" means a resolution of an image which is to be recorded by droplets of the ink (ink droplets) discharged from the nozzles 12N.

In the two nozzle rows R1 and R2, the positions of the nozzles 12N in the main scanning direction are shifted by half the pitch P. With this, in a case that the recording resolution in each of the nozzle rows R1 and R2 is 300 dpi, a recording resolution of 600 dpi is realized by the two nozzle rows R1 and R2. The head 1 of the present embodiment has a recording resolution of 600 dpi×600 dpi in the main scanning direction and the conveying direction.

In a case that the pump 10 as depicted in FIG. 2 is driven by a control of the controller 5, the ink inside the ink tank is thereby supplied to the common channel 12A via the supply port 121, and is distributed from the common channel 12A to the individual channels 12B.

In a case that a piezoelectric element 13X (to be described later on) is driven so as to reduce the volume of the pressure chamber 12P, the ink inside each of the individual channels 12B is discharged as ink droplets from the nozzle 12N.

The ink which has moved inside the common channel 12A from the one end toward the other end in the main scanning direction thereof and reached the return port 122 is returned to the ink tank via the tube.

As depicted in FIG. 4, the actuator member 13 is fixed to the upper surface of the channel member 12. The actuator member 13 includes a vibration plate 13A made of a metal, a piezoelectric layer 13B and a plurality of individual electrodes 13C.

The actuator member 13 is a thin film piezoelectric element which is formed by performing film formation sequentially, on the upper surface of the vibration plate 13A, of a thin film which is to be the piezoelectric layer 13B and a thin film which is to be the individual electrodes 13C. The thin film piezoelectric element is so-called micro electro-mechanical systems (MEMS). The thickness of the thin film piezoelectric element is not more than 1.5 μm.

The vibration plate 13A is arranged on the upper surface of the channel member 12 so as to cover the pressure chambers 12P. The piezoelectric layer 13B is arranged on the upper surface of the vibration plate 13A. Each of the individual electrodes 13C is arranged on the upper surface of the piezoelectric layer 13B so as to overlap, in the vertical direction, with a pressure chamber 12P corresponding thereto.

A part in the vibration plate 13A and a part in the piezoelectric layer 13B which are sandwiched between each of the individual electrodes 13C and one of the pressure chambers 12P function as a piezoelectric element 13X. The piezoelectric element 13X is independently deformable in accordance with a potential applied to the individual electrode 13C.

The vibration plate 13A and the individual electrodes 13C are electrically connected to a driver IC 14. The driver IC 14 maintains a potential of the vibration plate 13A at the ground potential, whereas the driver IC 14 changes the potential of each of the individual electrodes 13C. The vibration plate 13A functions as a common electrode which is an electrode common to the piezoelectric elements 13X. The driver IC 14 generates a driving signal based on a control signal from the controller 5 and supplies the driving signal to each of the individual electrodes 13C. The driving signal changes the potential of each of the individual electrodes 13C between a predetermined driving potential and the ground potential.

<Analysis>

The inventor of the present disclosure uses analytic models of 2000 pieces of the head 1, and analyzed a relationship among a natural frequency Fr of the individual channel 12B, the diameter D of the nozzle 12N and an amount V of an ink droplet discharged from the nozzle 12N.

The analytic models of 2000 pieces of the head 1 (2000 analytic models) are mutually different in the configuration of the individual channel 12B. The configuration of the individual channel 12B includes the width W of the pressure chamber 12P, the length L of the pressure chamber 12P and the diameter D of the nozzle 12N. The natural frequency Fr depends at least on the configuration of the individual channel 12B. Accordingly, in the 2000 analytic models, there are various natural frequencies Fr.

Figure 5:
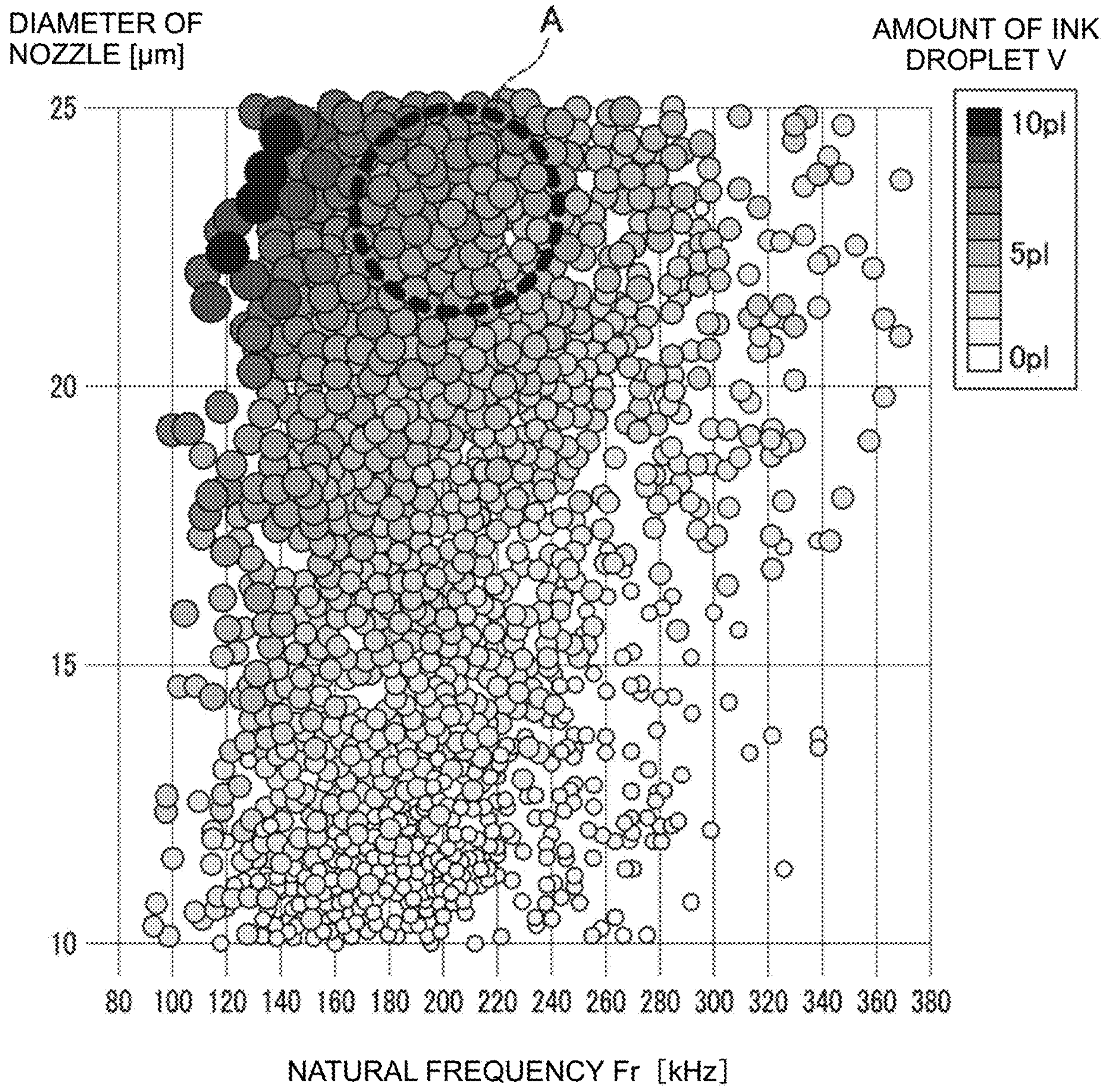
FIG. 5 is a graph indicating a relationship among a diameter D of a nozzle, a natural frequency Fr and an amount V of an ink droplet.

FIG. 5 is a graph in which the amount V of the ink droplet discharged by applying the driving signal to the piezoelectric element 13X in each of the analytic models is plotted in a gray scale. Note that in the 2000 analytic models, the driving potential was adjusted so that discharging velocities of the ink droplets became same among the 2000 analytic models.

A pulse width of a pulse included in the driving signal is equal to an Acoustic Length (AL). The AL is one way propagation time of a pressure wave in the individual channel 12B. Since the 2000 analytic models are mutually different in the configuration of the individual channel 12B, the ALs are mutually different among the 2000 analytic models. Therefore, the pulse widths were different among the 2000 analytic models.

It is appreciated from FIG. 5 that as the natural frequency Fr is higher, the amount V of the ink droplet is smaller.

Further, it is also appreciated that as the diameter D of the nozzle 12N is smaller, the amount V of the ink droplet is smaller.

In the present embodiment, the natural frequency Fr is made to be not less than 140 kHz so as to increase the driving frequency. Further, the recording resolution is made to be not more than 600 dpi. In order to record an image of satisfactory quality in this recording resolution, it is required to discharge an ink droplet of which amount is in a range of 6.5 pl to 8.5 pl from the nozzle 12N. Accordingly, an area A surrounded by broken line and a location in the vicinity thereof in FIG. 5 correspond to the present embodiment.

Figure 6:
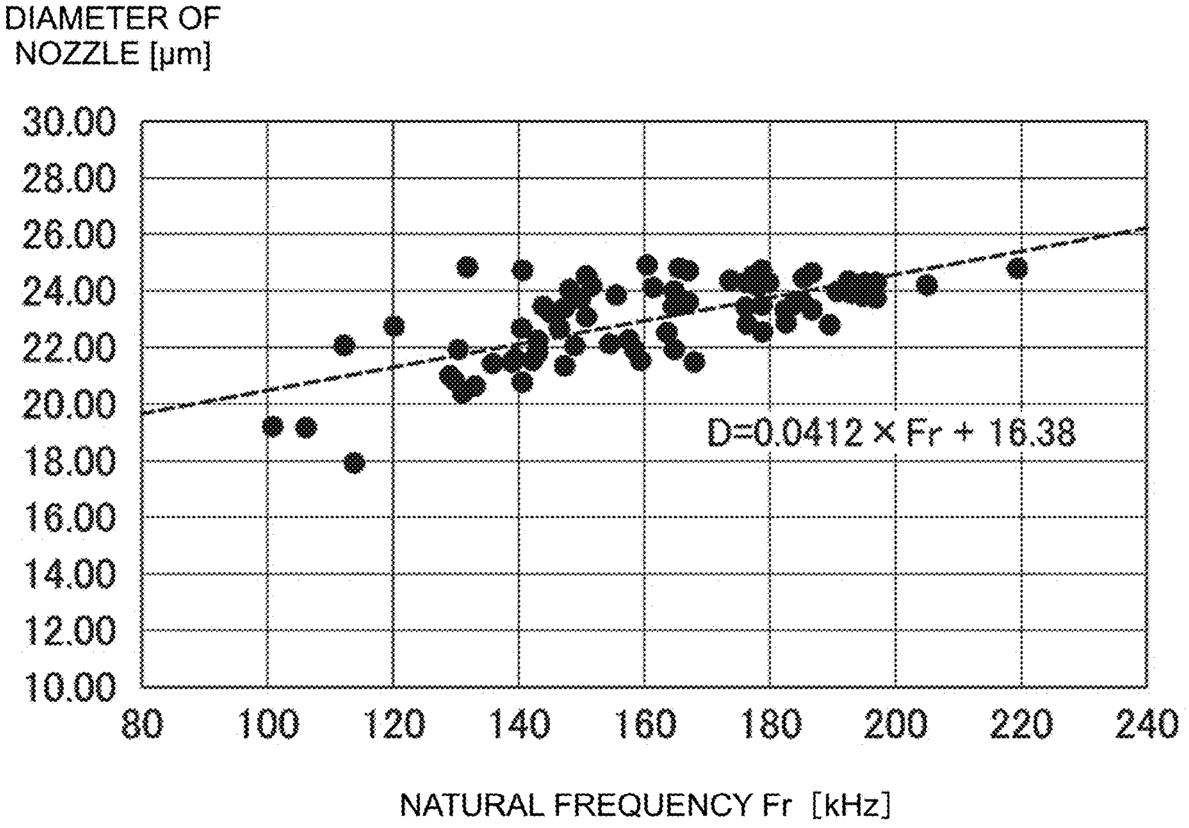
FIG. 6 is a graph indicating a relationship between the diameter D of the nozzle and the natural frequency Fr.

FIG. 6 is a graph of analytic models which are extracted from the 2000 analytic models and in each of which the amount of the ink droplet discharged was in the range of 6.5 pl to 8.5 pl. In FIG. 6, a relationship between the diameter D of the nozzle 12N and the natural frequency Fr in each of the extracted analytic models is plotted. From FIG. 6, an approximate straight line of "$D=0.0412\times Fr+16.38$" was obtained. From this result, in the present embodiment, the head 1 is configured so that the diameter D [μm] of the nozzle 12N and the natural frequency Fr [KHz] satisfy $D\geq 0.0412\times Fr+16.38$.

Figure 7:
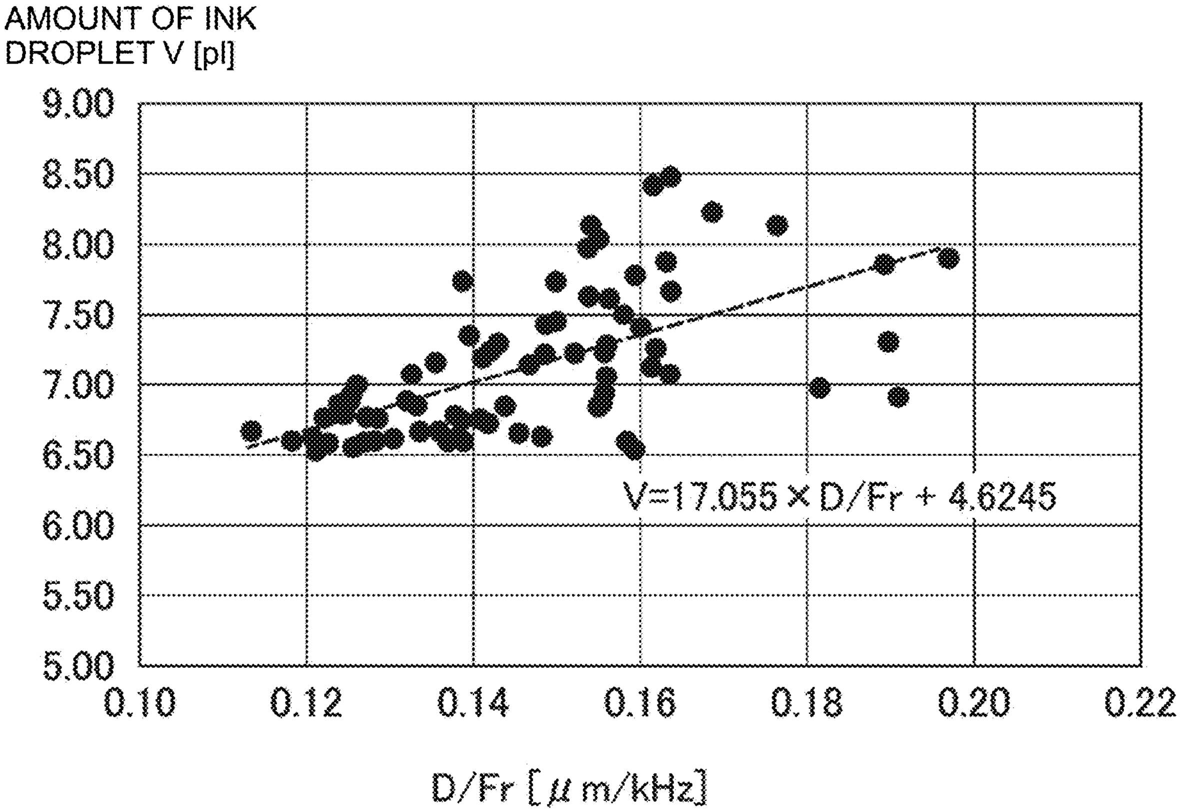
FIG. 7 is a graph indicating a relationship between D/Fr and the amount V of the ink droplet.

FIG. 7 is a graph of the analytic models which are extracted from the 2000 analytic models and in each of which the amount of the ink droplet discharged was in the range of 6.5 pl to 8.5 pl. In FIG. 7, a relationship between D/Fr and the amount V of the ink droplet in each of the extracted analytic models is plotted. From FIG. 7, an approximate straight line of "$V=17.055\times D/Fr+4.6245$" was obtained. In this approximate straight line, a range of D/Fr by which "V=6.5 pl to 8.5 pl" is obtained is in a range of 0.11 to 0.20.

From the above-described result, in the present embodiment, the head 1 is configured so that the diameter D [μm] of the nozzle 12N and the natural frequency Fr [KHz] satisfy $0.11\leq D/Fr\leq 0.20$. For example, in a case that the natural frequency is 150 kHz, the diameter D of the nozzle 12N is in a range of 16.5 μm to 30 μm, and in a case that the natural frequency is 160 kHz, the diameter D of the nozzle 12N is in a range of 17.6 μm to 32 μm. Note, however, that since the natural frequency Fr is not less than 140 kHz and satisfies $D\geq 0.0412\times Fr+16.38$, as described above, the diameter D of the nozzle 12N is not less than approximately 22.1 μm. Further, as described above, in the present embodiment, the diameter D of the nozzle 12N is made to be not more than 25 μm.

Furthermore, in the present embodiment, a discharging initial velocity of the ink droplet from the nozzle 12N is made to be not less than 7 m/s. The discharging initial velocity is a velocity in a case that a meniscus of the nozzle 12N is separated from the nozzle 12N and flies. In order to make the discharging initial velocity to be not less than 7 m/s, a waveform and a driving potential of the driving signal which the controller 5 causes the driver IC 14 to generate are adjusted.

In particular, in a case that the conveying velocity of the paper sheet 9 is not less than 70 m/minute, it is preferred that the discharging initial velocity is not less than 7 m/s in order to prevent any deviation in a landing position due to influence of an air current generated accompanying with the conveyance of the paper sheet 9. The landing position is a position, in the paper sheet 9, on which the ink droplet lands.

Effect of the Embodiment

As described above, according to the present embodiment, the natural frequency Fr is not less than 140 kHz, thereby making it possible to increase the driving frequency. Further, the recording resolution is not more than 600 dpi and that the diameter D [μm] of the nozzle 12N and the natural frequency Fr [KHz] satisfy $D\geq 0.0412\times Fr+16.38$, thereby making it possible to discharge the ink droplet in the amount V which is sufficient for the recording, as indicated by the result of the analysis. Here, the amount sufficient for the recording means an amount capable of making a discharge duty, which is a density of a liquid droplet per unit area, to be 100%.

Note that the natural frequency Fr is associated with the rigidity of the piezoelectric element 13X. In a case that the rigidity of the piezoelectric element 13X is small, the natural frequency Fr is low. In a case that the natural frequency Fr is less than 140 kHz and that the rigidity of the piezoelectric element 13X is small, the AL becomes long which in turn makes it impossible to increase the driving frequency.

The nozzles 12N are arranged at the pitch of not less than 300 dpi per one row, as depicted in FIG. 3. Owing to this, it is possible to make the size of the head 1 to be small, and to obtain a high image quality.

In a case that the diameter D of the nozzle 12N exceeds 25 μm, the amount V of the ink droplet discharged from the nozzle 12N becomes excessive. In a case that the amount V becomes excessive, the supply of the ink to the nozzle 12N might be unstable. Further, the ink droplet wets and spreads on the paper sheet 9 to a great extent, which in turn might deteriorate the image quality. In view of this, in the present embodiment, since the diameter D of the nozzle 12N is not more than 25 μm, the amount V of the ink droplet discharged from the nozzle 12N does not become excessive. Owing to this, it is possible to supply the ink stably to the nozzle 12N, and to prevent any lowering in the image quality which would be otherwise caused due to the wetting and spreading of the ink droplet.

The piezoelectric element 13X is the thin film piezoelectric element. Since the thickness of the thin film piezoelectric element is small, the thin film piezoelectric element is easily deformed and is sufficiently deformable even in a case that the size of the pressure chamber 12P is small. Accordingly, in the case that the piezoelectric element 13X is the thin film piezoelectric element, it is possible to realize both of: satisfying the requirement that the natural frequency Fr is not less than 140 kHz by making the size of the pressure chamber 12P small to thereby increasing the natural frequency Fr; and making the piezoelectric element 13X to be sufficiently deformable.

The thickness of the thin film piezoelectric element is not more than 1.5 μm. In this case, it is possible to realize the both points as described above, in a more ensured manner.

The recording resolution is 600 dpi×600 dpi. In this case, the amount V of the ink droplet is coincident with the amount V of the liquid droplet: V=6.5 pl to 8.5 pl in the above-described analysis, and thus it is possible to discharge, from the nozzle 12N, the ink droplet in the amount V which is sufficient for the recording, in a more ensured manner.

The diameter D [μm] of the nozzle 12N and the natural frequency Fr [KHz] satisfy $0.11\leq D/Fr\leq 0.20$. In this case, as depicted in FIG. 7, it is possible to discharge, from the nozzle 12N, the ink droplet in the amount V which is sufficient for the recording.

The width W of the pressure chamber 12P is not more than 70 μm. In this case, by making the size of the pressure chamber 12P to be small, the natural frequency Fr is increased, which in turn makes it possible to satisfy the requirement that the natural frequency is not less than 140 kHz, in more ensured manner.

The length L of the pressure chamber 12P is not more than 550 μm. In this case, since the size of the pressure chamber 12P is small, the natural frequency Fr is increased, which in turn makes it possible to satisfy the requirement that the natural frequency Fr is not less than 140 kHz, in more ensured manner.

In a case that the initial discharging velocity of the ink droplet from the nozzle 12N is less than 7 m/s, the flying direction of the ink droplet is more likely to be deviated from a desired direction, due to the influence of an air current generated accompanying with the conveyance of the paper sheet 9. Therefore, the landing position of the ink droplet is more likely to be deviated from a desired position. In view of this, in the present embodiment, the initial discharging velocity is not less than 7 m/s, which in turn stabilizes the landing position.

Modifications

Although the embodiment of the present disclosure has been explained above, the present disclosure is not limited to or restricted by the above-described embodiment, and various design changes can be made within the scope of the claims.

In the above-described embodiment, although the electrode constructing the piezoelectric element has a two-layered structure including the individual electrode and the common electrode, the electrode may have a three-layered structure. The three-layered structure is, for example, a structure including a driving electrode to which a high potential and a low potential are selectively applied, a high potential electrode maintained at the high potential and a low potential electrode maintained at the low potential.

In the above-described embodiment, although the opening of the nozzle is substantially circular, the opening may have a rectangular shape. In a case that the opening of the nozzle has the rectangular shape, the diameter of a circle having an area same as an area of this rectangular shape is made to be the diameter D of the nozzle.

The head is not limited to the head of the line system, and may be a head of a serial system.

The object of discharge is not limited to the paper sheet, and may be, for example, cloth (fabric), a substrate or plastic member, etc.

The liquid droplet discharged from the nozzle is not limited to the ink droplet. The liquid droplet may be, for example, a liquid droplet of a treatment liquid which agglutinates or precipitates a component in the ink.

The present disclosure is not limited to being applicable to the printer, and is applicable also to facsimiles, copy machines, multifunction peripherals, etc. Further, the present disclosure is applicable also to a liquid droplet discharging apparatus used for any other application than the recording of an image. For example, the present disclosure is applicable to a liquid droplet discharging apparatus which forms an electroconductive pattern by discharging an electroconductive liquid on a substrate.

What is claimed is:

1. A liquid droplet discharging apparatus, comprising:

a channel member having a channel including a nozzle and a pressure chamber communicating with the nozzle; and a piezoelectric element fixed to the channel member and configured to apply pressure to liquid inside the pressure chamber to discharge liquid droplets of the liquid from the nozzle, wherein a natural frequency Fr of the channel is not less than 140 kHz, a recording resolution which is a resolution of an image to be recorded by the liquid droplets is not more than 600 dpi, and a diameter D [μm] of the nozzle and the natural frequency Fr [KHz] satisfy: $D \geq 0.0412 \times Fr + 16.38$.

2. The liquid droplet discharging apparatus according to claim 1, wherein a plurality of nozzles including the nozzle is arranged in a row in a pitch of not less than 300 dpi.

3. The liquid droplet discharging apparatus according to claim 1, wherein the diameter D of the nozzle is not more than 25 μm.

4. The liquid droplet discharging apparatus according to claim 1, wherein the piezoelectric element is a thin film piezoelectric element.

5. The liquid droplet discharging apparatus according to claim 4, wherein a thickness of the thin film piezoelectric element is not more than 1.5 μm.

6. The liquid droplet discharging apparatus according to claim 1, wherein the recording resolution is 600 dpi×600 dpi.

7. The liquid droplet discharging apparatus according to claim 1, wherein the diameter D [μm] of the nozzle and the natural frequency Fr [KHz] satisfy: $0.11 \leq D/Fr \leq 0.20$.

8. The liquid droplet discharging apparatus according to claim 1, wherein a width of the pressure chamber is not more than 70 μm.

9. The liquid droplet discharging apparatus according to claim 1, wherein a length of the pressure chamber is not more than 550 μm.

10. The liquid droplet discharging apparatus according to claim 1, wherein discharging initial velocities of the liquid droplets from the nozzle are not less than 7 m/s.

* * * * *